May 8, 1956 W. COLLINI 2,744,360
METHOD OF MAKING ARTICLES FROM FUSIBLE MATERIALS
Filed March 13, 1952
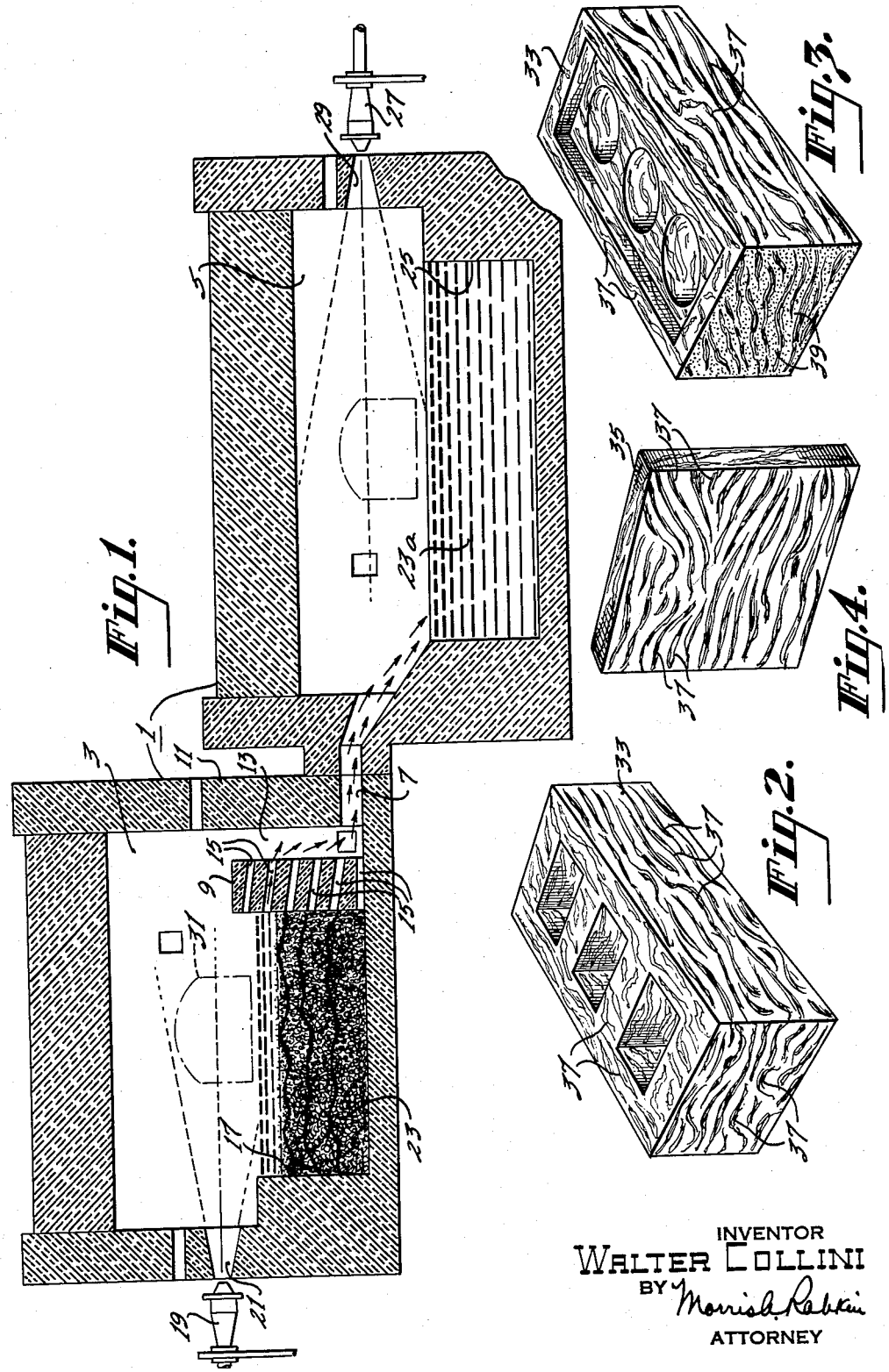
INVENTOR
WALTER COLLINI
BY
ATTORNEY

United States Patent Office 2,744,360
Patented May 8, 1956

2,744,360
METHOD OF MAKING ARTICLES FROM FUSIBLE MATERIALS

Walter Collini, Vineland, N. J.

Application March 13, 1952, Serial No. 276,339

4 Claims. (Cl. 49—85)

This invention relates to the method of making articles from fusible materials. While not limited thereto, the present invention relates particularly to a novel method of manufacturing building brick, tile, and the like, as well as to the novel brick, tile and similar products which result from this novel method.

In the conventional method of making building brick, for example, the raw materials are prepared suitably by grinding, screening and the like, after which they are mixed and tempered to produce desired plasticity, uniformity and homogeneity. A batch of the material thus treated is then shaped into units of desired size, usually by extruding from a pug mill, cutting and pressing in molds. Thereafter, the shaped bricks are dried and then burned or fired in kilns, following which they are cooled and tempered, if need be. These operations, which consume considerable time, produce brick of well known form, the brick being more or less brittle and porous, having a rough texture, and generally being of uniform color.

The primary object of my invention is to provide an improved method of making brick and the like.

More particularly, it is an object of my intention to simplify greatly and speed up the manufacture of brick and the like.

Another object of my invention is provide an improved method of producing novel brick, building block, tile or the like which is of variegated color and therefore highly ornate and most pleasing in appearance.

It is also an object of my invention to provide an improved method as aforesaid which is inexpensive, highly practical commercially, and very efficient in practice.

In accordance with my invention, after preparation of the raw materials of a particular batch, they are mixed thoroughly in dry state to provide a heterogeneous mixture and various such batch mixtures are charged in layers or strata directly in a furnace which is maintained at a suitable temperature depending upon the raw materials in the various batch mixtures. A flame within the furnace is arranged to play on the top of the charge. Thus, on completion of the fill or charge in the furnace charging tank, the charge begins to melt or fuse at the top and flows off the surface into a receiving or collecting tank. The action continues from the constantly changing top of the charge and is fast and continuous as the charge melts down, always from the top surface of each succeeding batch or layer. The fused mass is maintained in fused condition by a burner which may also play on the top of the mass in the collecting tank. Since the original, dry mixtures constituting the charge in the furnace were heterogeneous, the fused mass in the collecting tank is similarly heterogeneous and characterized by varicolored streaks and other patterns. The fused mass is removed from the collecting tank in melted state and placed directly in suitable molds where it is pressed and molded into brick, block, tile or similar units of standard or any other desired form. Immediately after pressing, the units are either run through a continuous lehr or are placed in an annealing oven. The resulting product is of fine, strong texture of multicolor effect and has a glazed appearance suggestive of glass. However, it is unlike glass in that, whereas glass is frangible and non-crystalline, my improved brick or the like is tough and crystalline in structure. As for the color variegations, these are not merely superficial but penetrate and extend throughout the entire unit.

The invention, as well as additional objects and advantages thereof, will be better understood from the following description, when read in connection with the accompanying drawing, in which Figure 1 is a central, sectional view of one form of furnace which may be employed in carrying out my improved method, Figure 2 is a perspective view of one form of building brick according to my invention, Figure 3 is a perspective view of a slightly different form of brick according to my invention, and Figure 4 is a perspective view of one form of tile according to my invention.

Referring more particularly to the drawing, there is shown, in Figure 1, a furnace 1 having a melting tank or chamber 3 into which the raw material is charged, and a receiving or collecting tank or chamber 5, the chambers 3 and 5 being connected by a throat 7. The furnace, or at least the throat 7 thereof, should be inclined slightly downwardly toward the collecting tank 5. Within the charging tank 3 is a wall 9 in proximity to the forward wall 11 of the tank 3 but spaced therefrom to provide a channel 13 with which the throat 7 communicates directly. The wall 9 is formed with a plurality of passages 15, inclined downwardly in a forward direction, to provide a lattice wall structure the passages 15 of which afford communication between the channel 13 and the batch receiving well 17 of the tank 3. One or more burners 19 are arranged to project flame through openings 21 to play on the surface of a charge 23 in the well 17 and to melt the charge at the surface thereof. As the charge melts gradually at the top, it flows in a continuous stream down through the passages 15, down along the channel 13, through the throat 7, and into the preheated well 25 of the collecting tank 5. One or more burners 27 are disposed to project flame through openings 29 to play on the melted or fused batch 23a which collects in the well 25.

The charge 23 (of brick material mixtures, for example) is charged into the tank 3 through a charging door 31 and collects in the well 17. As the flame from the burner or burners 19 plays on the top surface of the charge, the top layer thereof is brought to the melting point and the liquefied mass flows down through the passages 15, the channel 13 and the inclined throat 7 into the preheated well 25 of the collecting tank 5 from which it is withdrawn for use before the color variegations begin to diffuse or become cloudy, the material being maintained in fused or melted condition by the flame from one or more of the burners 27. Of course, as the fused top layer of the charge 23 flows off, a new top layer becomes exposed to the flame thereabove to become fused, in turn. This action is continuous so that, once fusion of the mass 23 has begun, the successive, newly fused, top layers will flow down in a continuous or uninterrupted stream. From the collecting tank 5, the fused mass 23a is removed either manually, or automatically by a suitable machine, to a suitable press and molded, while in fused state, into brick units of desired shape and size. Immediately after pressing, the bricks are either run through a continuous lehr or they are placed in a suitable annealing oven to relieve them from stresses and strain and to render them tough and strong.

In accordance with my invention, the charge 23 is preferably made up of a plurality of layers each of a heterogeneous mixture of materials suitable for the production of brick, block, tile and the like, depending upon the ultimate product which is desired. In the case of brick and building block, the essential ingredient of each mixture would be clay, and it would also include filler, coloring material, plasticizer, etc. Since the batch ingredients have different color-imparting characteristics, as the successive batch surface layers melt, they flow off in layers or streams of different colors, depending upon the constituents of each batch. Hence, the fused mass in the collecting tank 5 is more or less streaked with layers or patterns of different colors and is, therefore, also heterogeneous. Consequently, when the bricks 33, tile 35 or other articles are molded, they are not uniform in color but are interspersed with multi-colored, streak-like layers 37 which extend throughout the articles and penetrate thereinto from the surface to provide a most pleasing appearance. The bricks 33 and tile 35 usually have a predominant, basic color and the layers 37 have one or more other and different colors to provide vari-colored, two-tone or other multi-tone effects. Multi-color effects may also be obtained by employing two or more different, basic batches during the fusing process. The various colors are not merely superficial but are more or less solid through and through.

Examples of various batch materials which I have used in making brick according to the present invention are the following, the parts being indicated by weight and clay being the essential ingredient in each case:

*Batch No. 1*

|  | Parts |
|---|---|
| Clay | 25 |
| Sand | 30 |
| Limestone | 20 |
| Feldspar | 10 |
| Soda | 25 |

*Batch No. 2*

| Clay | 40 |
|---|---|
| Sand | 40 |
| Limestone | 25 |
| Feldspar | 15 |
| Soda | 10 |

*Batch No. 3*

| Clay | 40 |
|---|---|
| Sand | 40 |
| Aplite | 30 |

The three batches are generally or basically white when substantially iron-free clay and sand are used, and they are basically green when iron impurities are found in the clay and sand. By adding various other ingredients, various colors can be introduced. For example, by adding 2.5 parts of manganese and 2 parts of iron oxide to Batch Nos. 1 and 2, an amethyst effect is introduced. On the other hand, if 0.75 part of solenium oxide and one part of cadmium sulphide are added to either of these batches, a ruby-like color is produced. Similarly, the addition of only very small amounts of chrome green and copper oxide to Batch No. 3 produces a chrome green effect, while the introduction of small amounts of cobalt and copper oxide to the same batch produces a cobalt blue color. These and various other ingredients may be added at will to provide all sorts of color combinations and effects.

The temperatures in the tanks 3 and 5 will depend upon the particular batch composition in each case and may vary, for example, from about 1700° F. to about 3000° F. For common building brick, drain tile and hollow ware, the temperatures may vary between approximately 1700° F. and approximately 2000° F. In the case of roofing tile, floor tile, sewer pipes, etc., the furnace temperature may be held at from about 1800° F. to about 2200° F. On the other hand, fire brick and fire clay products may require temperatures ranging from about 2000° F. to about 2500° F., while silica and magnesite brick may require temperatures in the range from about 2700° F. to 3000° F. and over. In general, the furnace temperature is maintained 300 or 400 degrees higher than the fusion temperature of the batch.

Articles manufactured as above described have a fairly smooth, glazed surface resembling glass or glazed porcelain. However, my improved product is to be distinguished from glass and porcelain in several significant respects. For example, glass is made from glass material batch, basically silica, which is fused, refined and tempered, whereas my novel articles are formed merely by fusing the brick material batch, basically clay, without refining, and then directly molding. Thus, whereas glass making consumes from 12 to 18 hours for the tank treatment alone, my improved process of making bricks and the like takes only from 1 to 2½ hours for the tank treatment. Again, glass is not crystalline in character and therefore has a smooth surface, particularly when polished, whereas articles made according to my improved method described above are crystalline and the surface thereof is not absolutely smooth, even when polished, due to the crystalline character thereof. Moreover, the novel brick of my invention may be cut, split, sawed, hacked, chiseled or otherwise treated similarly to conventional brick, whereas glass and porcelain cannot be handled in this manner. In fact, the novel brick of my invention may be set with mortar and otherwise handled according to established practice which is conventional in the brick laying art. This, of course, is hardly possible with glass. Brick and the like produced in accordance with the present invention is not only tough, strong and durable, as well as being highly ornamental, but it can be made accurate and precise in size, with clean cut, smooth edges, and it will not warp. The surfaces thereof can be either relatively smooth, as shown in Figures 2 and 4 and on the sides in Figure 3 when formed in molds having smooth walls, or they may be stippled or otherwise roughened, as shown on the end 39 in Figure 3, if the mold walls are correspondingly rough.

From the foregoing description, it will be apparent to those skilled in the art that I have provided not only an improved, greatly simplified method of making articles such as brick or the like, but also novel forms of such articles not heretofore known. The improved method herein described speeds up the production of these articles as much as six-fold and more in some cases.

Although I have shown and described but one furnace for carrying out my improved method, and several forms of brick and tile resulting therefrom, it will undoubtedly also be apparent to those skilled in the art that many other forms of each are possible. Also, if desired, the original batch may be made moist by addition of a suitable amount of moisture. Other, similar changes may also be made. Therefore, I desire the foregoing description to be taken only as illustrative and not as limiting. Furthermore, wherever I have used the term "brick" in this specification, including the appended claims, I desire to have it understood that I wish this term to be construed to include "building block," "tile," "roofing," "flooring," "wall structures," "pipes" and other similar products and articles, as well as novelty articles and art ware such as trays, creamers, candle stick holders, vases, and so on.

I claim as my invention:

1. The method of producing articles of variegated color from mixtures of fusible materials, each said mixture having ingredients of different color imparting characteristics, which comprises arranging a plurality of superposed layers of said mixtures to provide a charge, fusing successive top layers of said charge, causing the successive, newly-formed, fused top layers of said charge to flow off from the remainder of said charge, collecting said flowed-off layers in a fused mass having portions of variegated colors by reason of said ingredients, and molding discrete parts of said variegated mass into said articles before said portions have become diffused throughout said mass.

2. The method of producing articles of variegated color from mixtures of fusible materials, each said mixture having ingredients of different color imparting characteristics, which comprises arranging a plurality of superposed layers of said mixtures to provide a charge, continuously fusing successive top layers of said charge, causing the successive, newly formed, fused top layers of said charge to flow off from the remainder of said charge in a continuous stream, collecting said flowed-off layers in a fused mass having portions of variegated colors by reason of said ingredients, and molding discrete parts of said variegated mass into said articles before said portions have had an opportunity to become diffused throughout said mass.

3. The method of producing articles of variegated color from mixtures of fusible materials, each said mixture having ingredients of different color imparting characteristics, which comprises arranging a plurality of superposed layers of said mixtures to provide a charge, continuously fusing successive top layers of said charge, causing the successive, newly formed, fused top layers of said charge to flow off from the remainder of said charge in a continuous stream, collecting said flowed-off layers in a mass having portions of variegated colors by reason of said ingredients, maintaining said variegated mass in a fused state and in variegated form, and transferring discrete portions of said variegated, fused mass for molding into said articles.

4. The invention set forth in claim 3 characterized in that said mixtures and layers are so related that said stream is variegated in color.

References Cited in the file of this patent
UNITED STATES PATENTS

| | | |
|---|---|---|
| 711,319 | Jacobs | Oct. 14, 1902 |
| 1,228,538 | Dennison | June 5, 1917 |
| 1,529,947 | Freese | Mar. 17, 1925 |
| 1,627,245 | McIntosh | May 3, 1927 |
| 1,963,910 | McIntyre et al. | June 19, 1934 |
| 2,012,798 | Whittier | Aug. 27, 1935 |
| 2,205,534 | Lytle | June 25, 1940 |
| 2,247,318 | Smyth | June 24, 1941 |
| 2,262,069 | Turk | Nov. 11, 1941 |